March 20, 1934. H. W. JEWELL 1,951,512
BELL END PIPE CONSTRUCTION
Filed Aug. 31, 1932

Inventor
Howard W. Jewell
By Lyon & Lyon
Attorneys

Patented Mar. 20, 1934

1,951,512

UNITED STATES PATENT OFFICE 1,951,512

BELL-END PIPE CONSTRUCTION

Howard W. Jewell, Los Angeles, Calif., assignor to Pacific Clay Products, Los Angeles, Calif., a corporation of California Application August 31, 1932, Serial No. 631,111

5 Claims. (Cl. 137—75)

This invention relates to bell-end pipes, such as are used for sewer, drainage, and fluid pressure lines.

An object of the invention is to provide a bell-end pipe that even in large sizes, will have ample tensile strength to resist the forces tending to burst the bell.

Another object is to simplify the construction and reduce the cost of producing bell-end pipe in large sizes.

Still another object is to provide a bell-end pipe having a plurality of radially adjustable members projecting inwardly from the bell for centering the end of the next section of pipe within the bell.

It is common practice to form clay pipe, such as sewer pipe, in sections, each section having a straight end and a bell-end. Consecutive sections of pipe are then joined together by inserting the straight end of one section into the bell-end of the next section, and packing cement mortar within the bell to seal the joint.

However, such construction is not satisfactory with large sizes of clay pipe for the reason that by the accepted method of construction the bell is formed by expanding the end of the pipe and this reduces the tensile strength of the clay at the base of the bell where it merges with the barrel, or straight portion, of the pipe. Furthermore, if a bell-end is formed on a section of clay pipe of large diameter, it is very apt to be broken during shipment because of the fact that it projects radially outward beyond the rest of the pipe, and a broken bell cannot be repaired with the same type of material.

In accordance with the present invention, clay pipe can be manufactured with straight end sections and a bell-end of reinforced concrete molded onto the pipe at or near the location of the pipe line.

One defect of a concrete bell-end is that concrete is subject to corrosion by acids or gases sometimes present in the liquids to be conducted. In accordance with this invention corrosion of the concrete bell-ends is prevented by a special form of joint in which acid-resistant material is poured into the space between the ends of the clay pipe at the joint, thereby sealing the interior of the pipe away from the concrete bell.

This application is in part a continuation of my copending application Serial No. 579,185, filed December 5, 1931 on Bell-end pipe construction.

A full understanding of my invention may be had from the following description, taken in connection with the accompanying drawing, in which Figure 1 is an end view of a pipe with a concrete bell, together with the molds for forming the latter;

Figure 1:
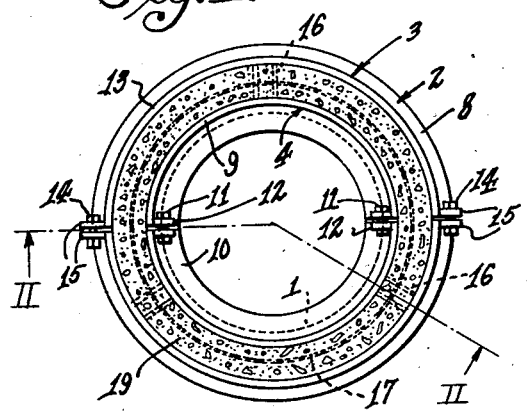
Figure 2:
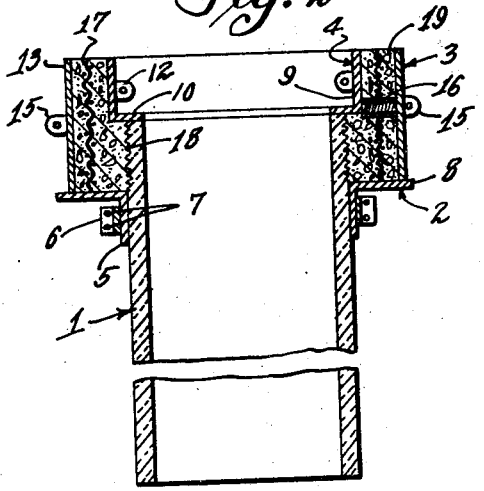
Figure 2 is a cross sectional view in plane II—II in Figure 1.

Referring to Figures 1 and 2, pipe 1, on which a bell-end is to be cast, is placed in vertical position and a mold attached thereto for shaping the bell.

This mold comprises a lower base portion 2, an outer wall 3, and an inner wall 4. The base member 2 comprises a pair of semi-cylindrical bands 5 (only one of which is shown in Figure 2), adapted to be placed about the pipe 1 and clamped together by means of any suitable clamping device. I have disclosed for this purpose a wing 6 extending outwardly from the end of each band and having apertures 7 therein, through which screws or bolts may be passed to secure it to a corresponding wing on the other band, to which it is to be clamped.

Each band 5 has secured thereto, or formed integrally therewith, a flange 8 extending outwardly from its upper edge. This flange forms the bottom of the mold when it is clamped about the pipe, as is shown in Figure 2.

The inner wall 4 comprises a pair of semi-cylindrical bands 9 having formed integrally therewith an inwardly projecting flange 10. Each pair of bands 9 is secured together by screws 11 passing through wings 12 on the ends of the bands. The inwardly projecting flanges 10 are so dimensioned that when the two bands are joined together, their inner edges define a circle of substantially the same diameter as the inside of the pipe. This makes it easy to center the inner wall 4 with respect to the pipe.

The outer wall 3 is formed of a pair of semi-cylindrical bands 13 joined together by screws or bolts 14 passing through wings 15 on each end thereof. The outer wall 3 rests on and is supported by the base member 2 and it may be conveniently centered with respect to the inner wall 4 by inserting three or more pieces of small metal tubing, such as half-inch, inch, or even larger galvanized iron pipe, radially between the inner and outer walls, as shown at 16. These tubes 16 remain in the bell and are useful in laying the pipe and in making an acid proof joint, as will be described later.

When the elements of the mold have been assembled, as described, reinforcing material is placed within the mold and it is then filled with concrete. The reinforcing material may be of wire, or rod form, or it may be in the form of a woven fabric, as shown at 17, the circumferential wires of the fabric serving to give the necessary tensile strength to the concrete and the vertical members serving to retain the circumferential members in position. If woven fabric reinforcing material is used, it is convenient to form holes therein for supporting the radial tubular members 16 in position.

After the concrete has been poured and has set, the forms may be disassembled by removing the screws holding the separate elements together and pulling them away from the pipe and the concrete.

In order to obtain a good joint between the pipe and the concrete bell, it is desirable to form corrugations or threads, or otherwise score the outer surface of the pipe, as shown at 18.

Pipes having bell ends molded thereon, as described, may be joined together in the usual manner of joining bell-end pipes, that is, merely by packing the joint with cement mortar or other suitable material. However, in instances where the pipe line is to carry liquids containing acids that will attack concrete, it is necessary to use a special joint construction to prevent contact of the pipe contents with the bell end or with the cement mortar used to seal the joint.

Figure 3:
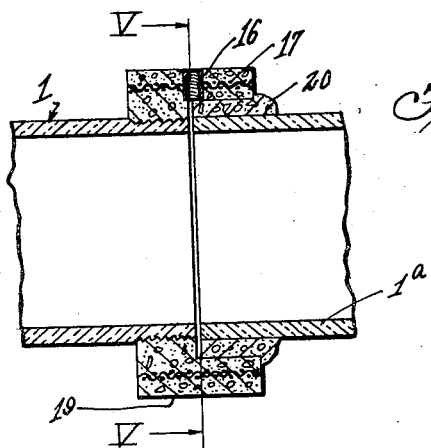
Figures 3 and 4 are sectional views showing the construction of a joint in accordance with my invention and Figure 5 is a cross-section of a joint, taken in the plane V—V of Figure 3.
Figure 4:
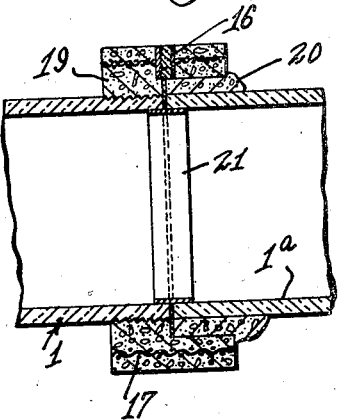

Referring now to Figures 3 and 4, a special form of acid-resistant joint will be described. Thus, referring to Figure 3, a pipe 1 having a bell end 19 of concrete thereon, is shown joined to a straight end pipe 1a, this joint being made by positioning the ends of the two pipes a short distance apart as shown, and securing them in this position by packing cement mortar 20 between the outer surface of the pipe 1a and the inner surface of the bell end 19. During the placing of the mortar 20, some of it will be forced beyond the end of pipe 1a and may even be extruded through the space between the ends of the pipes into the inside thereof. However, before it has had time to set, the mortar extending beyond the end of the pipe 1a is removed by way of the interior of the pipe (since this invention is particularly applicable to extremely large pipes, the removal of the mortar can be effected by a laborer working from within the pipe). After this cleaning operation, the joint appears as shown in Figure 3.

Referring now to Figure 4, a runner 21 of heavy paper or other suitable material, is placed over the crack between the ends of the pipe, this runner extending circumferentially around the joint, and a sealing compound, such as bitumen, poured into the crack between the ends of the pipe, through one of the tubes 16. Before the joint was made, the section of pipe 1 was so oriented that one of the tubes 16 was positioned at the top of the bell. The acid-resistant sealing compound is usually poured hot so that it solidifies immediately upon cooling. Thereafter, the runner 21 may be removed is desired, or it may be left in the pipe as it will be washed out eventually by the liquid flowing therethrough.

As shown in Figure 1, the bell is preferably provided with three or more apertures 16. At the time the acid-resistant material is poured into the joint, only the uppermost aperture is left open, as otherwise the material might run out of the lower apertures. The latter are therefore plugged with cement mortar during the cementing operation, so that no subsequent loss of the acid-resistant material can occur through them.

In the embodiment of the invention described, the tubes 16 were used merely to space the molds during the construction of the bell, and to admit sealing compound after the pipe was laid.

Figure 5:
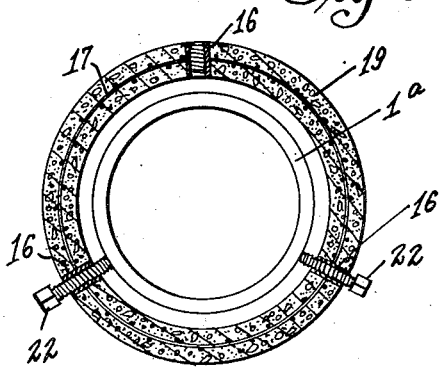

They may also serve another function, i. e.; facilitating the centering of the small end of one pipe section in the bell of the adjoining section. To this end the inner surfaces of tubes 16 are threaded, and bolts 22 are screwed into the two lowermost tubes 16, as shown in Figure 5. By turning bolts 22 until they project the proper distance within the bell, the end 1a of the next section of pipe may be accurately centered within the bell, and held in centered position while the cement is placed and hardened. Such supporting means is very desirable as its adjustability permits accurate centering of the pipes which are never perfectly round, and facilitates the packing of the mortar on the lower side of the pipe.

To facilitate the laying of the pipe each bell may be gauged before it is placed in the line, and the bolts 22 inserted in those tubes 16 that occur adjacent one end of the largest diameter of the bell. As previously indicated the pipes and bells are practically always slightly oval or elliptical in cross section instead of being perfectly round.

I claim:

1. As an article of manufacture, a clay pipe having a reinforced concrete bell cast on the end thereof.

2. As an article of manufacture, a clay pipe having a reinforced concrete bell cast on the end thereof, the outer surface of said pipe at its point of joinder with the concrete being provided with circumferentially extending grooves.

3. As an article of manufacture, a clay pipe having a concrete bell cast on the end thereof, with circumferentially extending reinforcing members imbedded in said concrete.

4. As an article of manufacture, a clay pipe having a reinforced concrete bell cast on the end thereof, and a plurality of circumferentially spaced tubes projecting radially through the walls of said bell.

5. An article of manufacture as described in claim 4 in which said radial tubes are interiorly threaded to receive pipe centering bolts.

HOWARD W. JEWELL.